· US010802347B2

(12) United States Patent
Nagasawa (10) Patent No.: US 10,802,347 B2
(45) Date of Patent: Oct. 13, 2020

(54) DISPLAY DEVICE AND COLOR FILTER SUBSTRATE

(71) Applicant: Japan Display Inc., Minato-ku (JP)

(72) Inventor: Junko Nagasawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 58 days.

(21) Appl. No.: 15/708,445

(22) Filed: Sep. 19, 2017

(65) Prior Publication Data

US 2018/0088405 A1 Mar. 29, 2018

(30) Foreign Application Priority Data

Sep. 27, 2016 (JP) .................................. 2016-188263

(51) Int. Cl.
| G02F 1/1339 | (2006.01) |
| G02F 1/1335 | (2006.01) |
| G02F 1/1368 | (2006.01) |
| G02F 1/1337 | (2006.01) |
| G02F 1/1362 | (2006.01) |
| G02F 1/1333 | (2006.01) |

(52) U.S. Cl.
CPC ........ *G02F 1/13394* (2013.01); *G02F 1/1368* (2013.01); *G02F 1/133512* (2013.01); *G02F 1/133514* (2013.01); *G02F 1/1337* (2013.01); *G02F 1/136227* (2013.01); *G02F 2001/13396* (2013.01); *G02F 2001/13685* (2013.01); *G02F 2001/133388* (2013.01); *G02F 2001/133519* (2013.01); *G02F 2201/501* (2013.01)

(58) Field of Classification Search
CPC ............. G02F 1/133512; G02F 1/1368; G02F 1/136227; G02F 1/1337
See application file for complete search history.

(56) References Cited

U.S. PATENT DOCUMENTS

| 7,072,011 B2* | 7/2006 | Maeda .............. G02F 1/133555 349/114 |
| 2005/0243261 A1* | 11/2005 | Chiang ............. G02F 1/133514 349/155 |
| 2013/0342927 A1 | 12/2013 | Hino et al. |
| 2014/0160553 A1* | 6/2014 | Abe ........................ G02F 1/167 359/296 |
| 2016/0187704 A1* | 6/2016 | Lee ..................... G02F 1/13394 349/46 |
| 2017/0139090 A1 | 5/2017 | Hino et al. |

FOREIGN PATENT DOCUMENTS

| JP | 2014-016617 | 1/2014 |
| JP | 2014-174431 | 9/2014 |

* cited by examiner

*Primary Examiner* — Dung T Nguyen
(74) *Attorney, Agent, or Firm* — Oblon, McClelland, Maier & Neustadt, L.L.P.

(57) ABSTRACT

According to one embodiment, a liquid crystal display includes a first substrate, a second substrate including an insulating substrate, a first color filter, a second color filter, a first light-shielding layer, a second light-shielding layer, a first spacer and a second spacer, and a sealing member surrounding the second spacer and including a filler, and the first spacer having a same height as that of the second spacer, being in contact with the first substrate, the filler being interposed between the second spacer and the first substrate, and a thickness from the inner surface of the insulating substrate to a bottom of the second spacer being less than a thickness from the inner surface of the insulating substrate to a bottom of the first spacer.

10 Claims, 10 Drawing Sheets

DISPLAY DEVICE AND COLOR FILTER SUBSTRATE

CROSS-REFERENCE TO RELATED APPLICATIONS

This application is based upon and claims the benefit of priority from Japanese Patent Application No. 2016-188263, filed Sep. 27, 2016, the entire contents of which are incorporated herein by reference.

FIELD

Embodiments described herein relate generally to a display device and a color filter substrate.

BACKGROUND

Liquid crystal displays are used in various fields as display devices. Color liquid crystal displays comprise color filters. Light shielding layers are disposed between color filters of different colors to function of prevention color mixture in an oblique visual field. As a measure to against color mixture in an oblique visual field accompanying further expansion of viewing angle, such a technique is known that a liquid crystal display comprises an overcoat layer to cover a color filter, and a light-shielding layer disposed on a surface of the overcoat layer, which is on the liquid crystal layer.

Moreover, display devices each include a display area which displays images and a non-display area which surrounds the display area. Here, as a technique to remove the drawback that the non-display area may look brighter than the display area when the display is turned OFF, it is known that different coloring layers and light-shielding coloring layers are stacked on the non-display area.

DETAILED DESCRIPTION

In general, according to one embodiment, there is provided a liquid crystal display comprising a display area which displays images, a non-display area surrounding the display area, a first substrate, a second substrate comprising an insulating substrate, a first color filter disposed in the display area, a second color filter disposed in the non-display area, a first light-shielding layer disposed in the display area and provided on a first substrate side of the first color filter, a second light-shielding layer disposed in the non-display area and provided on a first substrate side of the second color filter, a first spacer disposed in the display area and a second spacer disposed in the non-display area, the second substrate opposing the first substrate and a sealing member disposed in the non-display area to surround the second spacer and comprising a filler, which attaches the first substrate and the second substrate together, the first color filter and the second color filter being provided on an inner surface of the insulating substrate, which opposes the first substrate, and the first spacer having a same height as that of the second spacer along a direction from the second substrate to the first substrate, being in contact with the first substrate, the filler being interposed between the second spacer and the first substrate, and a thickness from the inner surface of the insulating substrate to a bottom of the second spacer being less than a thickness from the inner substrate of the insulating substrate to a bottom of the first spacer.

According to one embodiment, there is provided a color filter substrate comprising: a light transmission area; a non-transmission area; an insulating substrate; a first light-shielding layer disposed in the light transmission area; a second light-shielding layer disposed in the non-transmission area; a first color filter disposed in the light transmission area and provided between the first light-shielding layer and the insulating substrate; a second color filter disposed in the non-transmission area and provided between the second light-shielding layer and the insulating substrate, a first thickness of the first light-shielding layer being different from a second thickness of the second light-shielding layer.

Embodiments are described with reference to accompanying drawings. Note that the disclosure is presented for the sake of exemplification, and any modification and variation conceived within the scope and spirit of the invention by a person having ordinary skill in the art are naturally encompassed in the scope of invention of the present application. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Further, in the specification and drawings, the structural elements, which have functions identical or similar to the functions described in connection with preceding drawings, are denoted by like reference numbers, and an overlapping detailed description thereof is omitted unless otherwise necessary.

First, a display device according to this embodiment will be described in detail.

Figure 1:
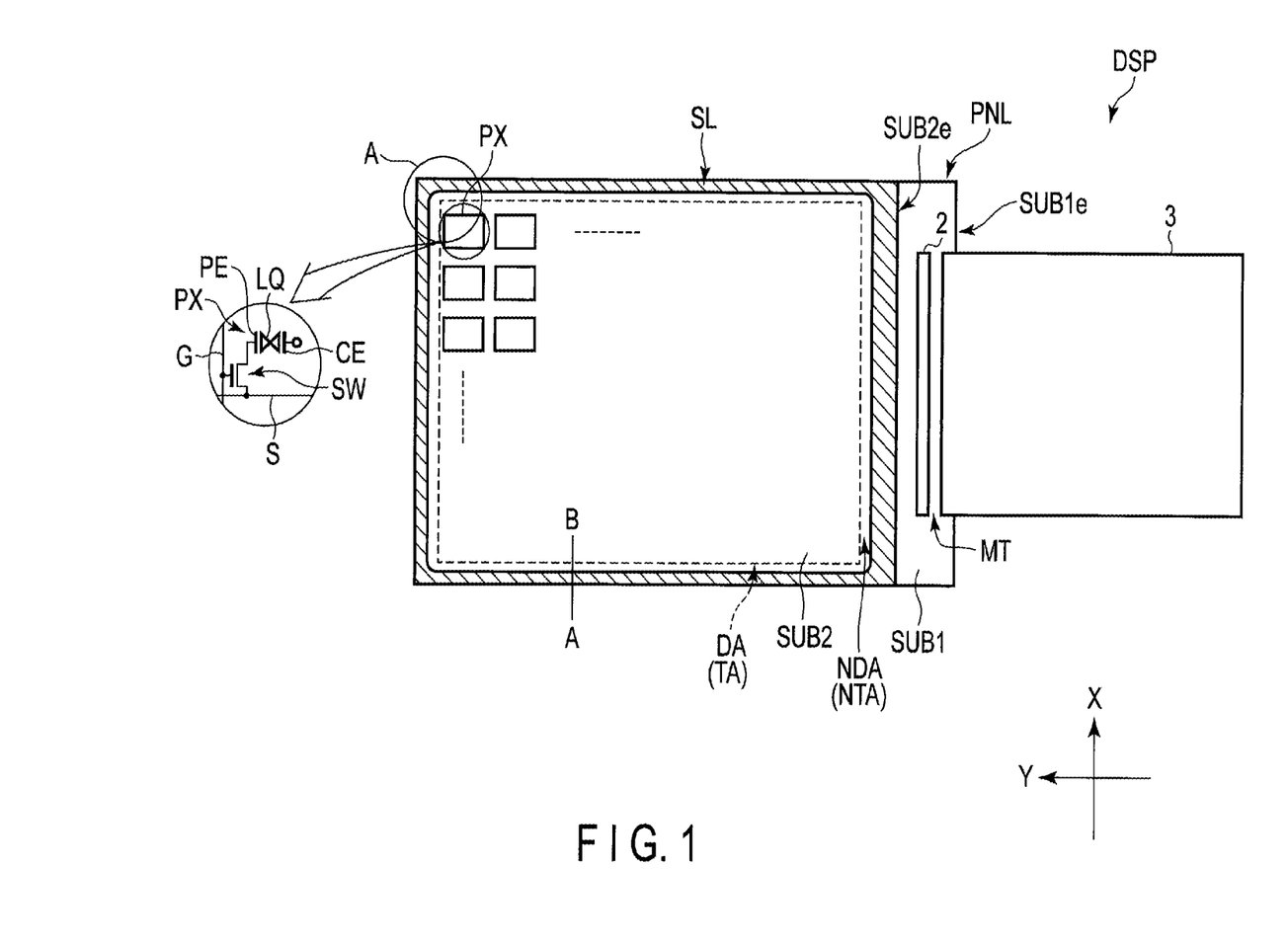
FIG. 1 is a diagram showing a structure and an equivalent circuit of a display panel, which is a part of a liquid crystal display of this embodiment.

FIG. 1 is a diagram showing a basic structure and an equivalent circuit of a display panel PNL constituting a display device DSP of this embodiment. Note that this embodiment will be described as an example in which a display device DSP is a liquid crystal display device.

Here, FIG. 1 shows a plan view of the display panel PNL in an X-Y plane defined in a first direction X and a second direction Y crossing each other. In the example shown here, a first direction X and a second direction Y are orthogonal to each other, but they may cross each other at any degrees other than 90°.

The display panel PNL includes a first substrate SUB1, a second substrate SUB2 opposing the first substrate SUB1, and a liquid crystal layer LQ held between the first substrate SUB1 and the second substrate SUB2. The first substrate SUB1 and the second substrate SUB2 are attached together with a sealing member SL with a predetermined cell gap formed therebetween. The liquid crystal layer LQ is held on an inner side surrounded by the sealing member SL, in a cell gap between the first substrate SUB1 and the second substrate SUB2. The display panel PNL includes a display area DA which displays images, within the area surrounded by the sealing member SL. The display area DA has, for example, approximately a rectangular shape and a plurality of pixels PX arranged in a matrix are located in the display area DA. Note that the display area DA may have some other polygonal shape, and edges thereof may be curved. The display panel PNL includes a frame-like non-display area NDA which surrounds the display area DA.

The second substrate SUB2 includes a light-transmission area TA which overlaps the display area DA in plan view, and a non-transmission area TA which overlaps the non-display area NDA in plan view. Note that in the light transmission area TA, members having light-shielding properties, such as wiring lines, may be disposed.

The first substrate SUB1 comprises, in the display area DA, gate lines G extending along the first direction X, source lines S extending along the second direction Y, switching elements SW each electrically connected to a respective gate line G and a respective source line S in a respective pixel PX, pixel electrodes PE each electrically connected to a switching element SW in a respective pixel PX, etc. In this embodiment, the first substrate SUB1 includes a common electrode CE.

The display panel PNL may be configured as a transmissive type which displays images by selectively transmitting light from a backlight unit placed on its rear surface side, or a reflective type which displays images by selectively reflecting external light entering the display panel PNL, or a trans-reflective type which is a combination of the transmission type and reflection type.

Signal supply sources necessary to drive the display panels PNL, such as a drive IC chip 2 and a flexible printed circuit (FPC) substrate 3 are located in the non-display area NDA. In the example illustrated, the drive IC chip 2 and the FPC substrate 3 are mounted in a mounting portion MT of the first substrate SUB1, which extends out from one substrate side edge SUB2e of the second substrate SUB2. The mounting portion MT is formed along with one substrate side edge SUB1e of the first substrate SUB1. In the example illustrated, the substrate side edges SUB1e and SUB2e are formed substantially parallel to the first direction X. Although will not be explained in detail, the first substrate SUB1 comprises, in the mounting portion MT, a pad to connect it to the signal supply sources. The pad includes the gate lines G, source lines S, etc., described above, which are electrically connected. In the example illustrated, the other three substrate-side edges of the second substrate SUB2 oppose the other three substrate-side edges of the first substrate SUB1.

The sealing member SL is formed on the non-display area NDA to enclose the display area DA. The sealing member SL is formed into a rectangular shape in the example illustrated.

Figure 2:
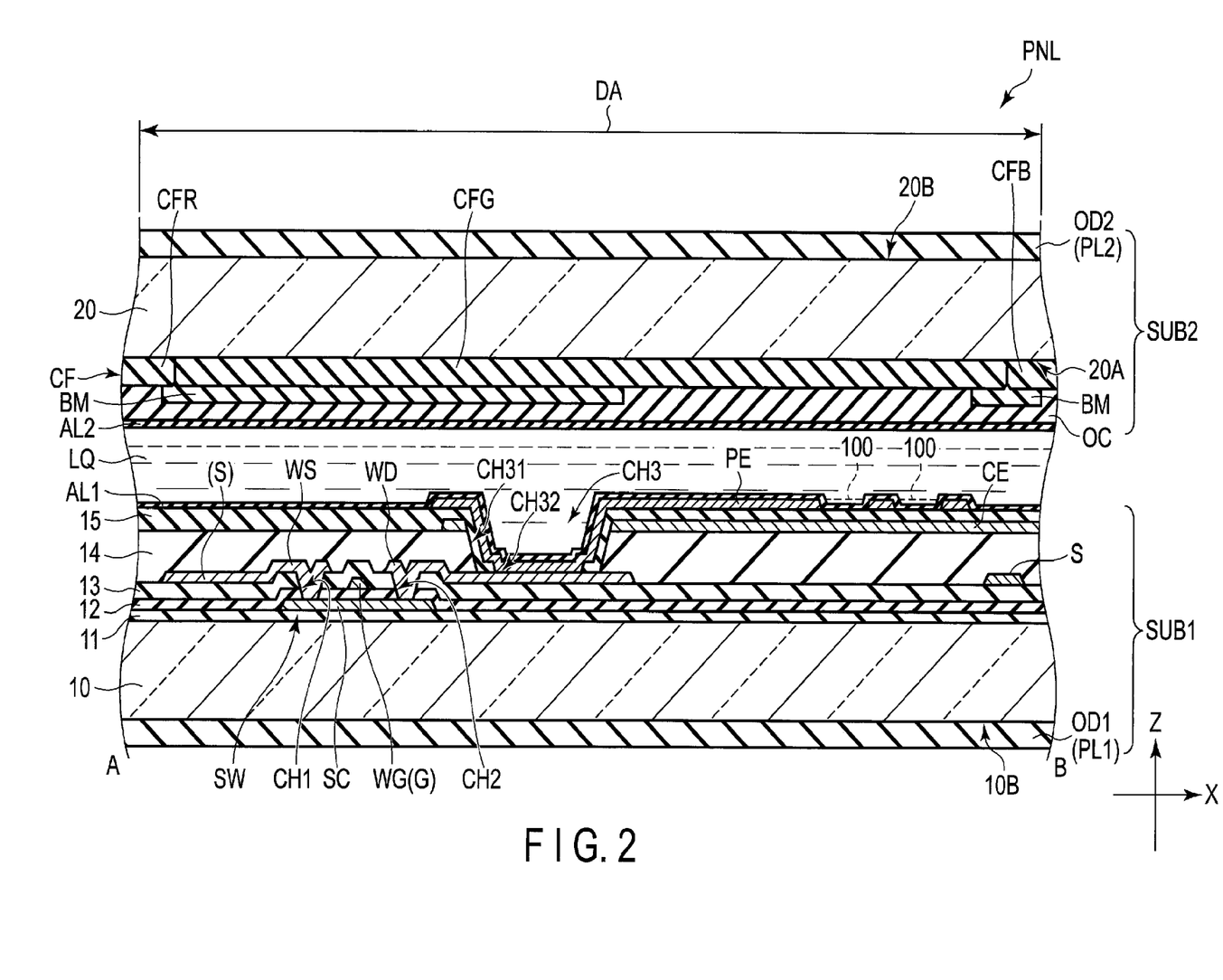
FIG. 2 is a cross-sectional view of a display area of the display device shown in FIG. 1.

FIG. 2 is a cross section of the display area DA of the display device DSP shown in FIG. 1. In the display panel PNL of this embodiment, both of pixel electrode PE and common electrode CE are provided on the first substrate SUB1, and they are applied to modes which use a lateral electric field along the main plane of the substrate, such as In-Plane Switching (IPS) mode and Fringe Field Switching (FFS) mode, which is one type of the IPS mode.

In this embodiment, the positive direction of the third direction Z or the direction from the first substrate SUB1 to the second substrate SUB2 is defined as upward or above, and the negative direction of the third direction Z or the direction from the second substrate SUB2 to the first substrate SUB1 is defined as downward or below. Moreover, such expressions as "the second member above the first member" and "the second member below the first member", the second member may be in contact with the first member or may be separated from the first member. When the second member is separated from the first member, the third member may be interposed between the first member and the second member. Meanwhile, such expressions as "the second member on the first member" and "the second member under the first member", the second member is in contact with the first member.

The first substrate SUB1 comprises a first insulating substrate 10, a switching element SW, a common electrode CE, a pixel electrode PE, a first insulating film 11, a second insulating film 12, a third insulating film 13, a fourth insulating film 14, a fifth insulating film 15, a first alignment film AL1 and the like.

The first insulating substrate 10 is a light-transmissive substrate such as a glass or resin substrate. The first insulating film 11 covers the first insulating substrate 10.

A semiconductor layer SC of the switching element SW is located on the first insulating film 11 and is covered by the second insulating film 12. The second insulating film 12 is located also on the first insulating film 11. A gate electrode WG of the switching element SW is formed to be integrated with the gate line G on the second insulating film 12, and is located above the semiconductor layer SC. The gate electrode WG is covered by the third insulating film 13 with the gate line G. The third insulating film 13 is located also on the second insulating film 12.

A source electrode WS and a drain electrode WD of the switching element SW are formed on the third insulating film 13. Further, a source line S is similarly formed on the third insulating film 13. The source electrode WS is formed to be integrated with the source line S. The source electrode WS is in contact with the semiconductor layer SC through a contact hole CH1 which penetrates the second insulating film 12 and the third insulating film 13. The drain electrode WD is in contact with the semiconductor layer SC through a contact hole CH2 which penetrates the second insulating film 12 and the third insulating film 13. The fourth insulating film 14 covers the switching element SW and the source line S. The fourth insulating film 14 is located also on the third insulating film 13.

The common electrode CE is formed on the fourth insulating film 14. The common electrode CE is a transparent electrode formed from a transparent conductive material such as indium-tin-oxide (ITO) or indium zinc oxide (IZO). The fifth insulating film 15 covers the common electrode CE. The fifth insulating film 15 is located also on the fourth insulating film 14.

The pixel electrode PE is formed on the fifth insulating film 15 in a position to oppose the common electrode CE. The pixel electrode PE comprises slits 100. The slits 100 are each formed above the common electrode CE. The pixel electrode PE is a transparent electrode formed from a transparent conductive material, for example, ITO or IZO. The pixel electrode PE is in contact with the drain electrode WD of the switching element SW through a contact hole CH3. The contact hole CH3 comprises a contact hole CH31 penetrating the fourth insulating film 14 to the drain electrode WD and a contact hole CH32 penetrating the fifth insulating film 15 to the drain electrode WD.

The first alignment film AL1 covers the pixel electrode PE. The first alignment film AL1 also covers the fifth insulating film 15. The first alignment film AL1 is formed from a material which exhibits horizontal alignment property and disposed on a surface of the first substrate SUB1, which is in contact with the liquid crystal layer LQ.

The first insulating films 11, the second insulating film 12, the third insulating film 13, and the fifth insulating film 15 described above are each formed from, for example, an inorganic material such as silicon oxide and silicon nitride. The fourth insulating film 14 is formed from, for example, an organic material such as a transparent resin.

The second substrate SUB2 comprises a second insulating substrate 20, color filters CF, a light-shielding layer BM, an overcoat layer OC, a second alignment film AL2 and the like.

The second insulating substrate 20 is a light-transmissive substrate such as a glass or resin substrate.

The color filters CF are disposed on an inner surface 20A of the second insulating substrate 20, which opposes the first substrate SUB1. The color filters CF are formed from resin materials colored in a plurality of colors different from each other, for example, red, blue and green. A red color filter CFR is disposed to correspond to a red pixel, a green color filter CFG is disposed to correspond to a green pixel, and a blue color filter CFB is disposed to correspond to a blue pixel.

The light-shielding layer BM is disposed on a surface of the color filter CF, which is on a side opposing the first substrate SUB1. The light-shielding layer BM is located to partition into pixels PX and oppose the wiring lines of the first substrate SUB1 such as the gate line G, source line S and switching element SW and the contact hole CH3. Although will not be explained in detail, the light-shielding layer BM formed to oppose each of the gate line G and source line S has a shape of lattice or stripe. The boundaries between adjacent color filters CF of different colors are located to overlay on the light-shielding layer BM.

The overcoat layer OC covers the color filters CF and the light-shielding layer BM. The overcoat layer OC flattens unevenness on the surfaces of the color filters CF and the light-shielding layer BM. The overcoat layer OC is formed from a transparent resin material.

The second alignment film AL2 covers the overcoat layer OC. The second alignment film AL2 also covers the overcoat layer OC. The second alignment film AL2 is formed from a material which exhibits horizontal alignment property and disposed on a surface of the first substrate SUB2, which is in contact with the liquid crystal layer LQ. The first substrate SUB1 and the second substrate SUB2 may be subjected to rubbing or optical alignment.

The first substrate SUB1 and the second substrate SUB2 are arranged so that the first alignment film AL1 and the second alignment film AL2 oppose each other. Here, between the first substrate SUB1 and the second substrate SUB2, a predetermined cell gap is formed of a spacer, which will be described later. The first substrate SUB1 and the second substrate SUB2 are attached together with a sealing member while maintaining the cell gap. The liquid crystal layer LQ is formed of a liquid crystal composition enclosed in the cell gap.

In an outer surface 10B of the first substrate SUB1, that is, an external surface 10B of the first insulating substrate 10, a first optical element OD1 including a first polarizer PL1 is disposed. In an outer surface of the second substrate SUB2, that is, an outer surface 20B of the second insulating substrate 20, a second optical element OD2 including a second polarizer PL2 is disposed. A first absorption axis of the first polarizer PL1 and a second absorption axis of the second polarizer PL2 are, for example, in a crossed-Nicol relationship in position.

Figure 3:
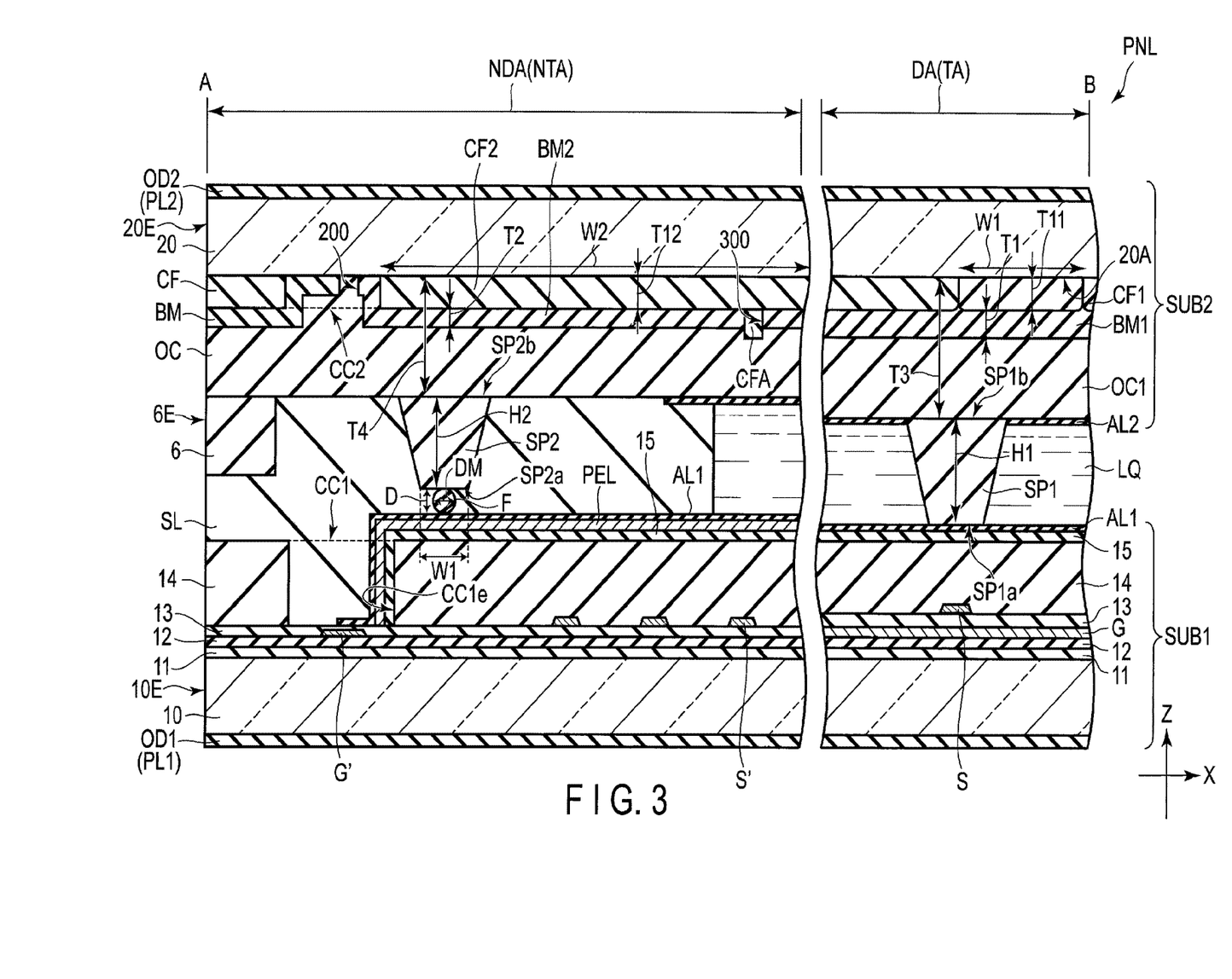
FIG. 3 is a cross-sectional view of an example of the display panel PNL taken along line A-B in FIG. 1.

FIG. 3 is a diagram showing a cross section of the display panel PNL taken along line A-B in FIG. 1. FIG. 3 shows a cross section of the display panel PNL in the display area DA and the non-display area NDA.

In the illustrated example, the first insulating film 11, the second insulating film 12, the third insulating film 13 and the fourth insulating film 14 extend from the display area DA to the non-display area NDA, or even to a position overlapping an edge portion 10E of the first insulating substrate 10. The fifth insulating film 15 and the first alignment film AL1 are arranged to extend to the non-display area NDA, but not fully to reach the position overlapping the edge portion 10E of the first insulating substrate 10. Further, in the non-display area NDA, a transparent conductive layer PEL is arranged between the fifth insulating film 15 and the first alignment film AL1. The transparent conductive layer PEL formed from the same material and in the same step as those of the pixel electrode PE disposed in the display area DA shown in FIG. 2, but is insulated from the pixel electrode PE.

The fourth insulating film 14 has a recess portion CC1 in a region overlapping the sealing member SL. The recess portion CC1 penetrates to the third insulating film 13. In the illustrated example, the fifth insulating film 15 is disposed inside the recess portion CC1 such as to cover a side surface CC1e of the recess portion CC1. The transparent conductive layer PEL is disposed inside the recess portion CC1 to be placed along the with side surface CC1e of the recess portion CC1. The transparent conductive layer PEL covers the fifth insulating film 15 inside the recess portion CC1. The first alignment film AL1 covers the transparent conductive layer PEL inside of the recess portion CC1.

For example, when the transparent conductive layer PEL does not cover the fifth insulating film 15, the first alignment film AL1 is in contact with the fifth insulating film 15. Here, while the first alignment film AL1 is being subjected to optical alignment treatment, ultraviolet rays irradiated onto the first alignment film AL1 may reach the interface between the first alignment film AL1 and the fifth insulating film 15, which may result in degrading in the bonding strength between the first alignment film AL1 and the fifth insulating film 15. In the illustrated example, however, the transparent conductive layer PEL covers the fifth insulating film 15, thereby making it possible to inhibit the first alignment film AL1 from detaching. Further, as described above, the fifth insulating film 15 covers the side surface CC1e of the recess portion CC1, and therefore the entering of moisture from the side surface CC1e to the fourth insulating film 14 can be inhibited. Furthermore, the first alignment film AL1 is in contact with the third insulating film 13 inside recess portion CC1, and therefore the entering of moisture from the interfaces between the fourth insulating film 14, the fifth insulating film 15 and the transparent conductive layer PEL can be inhibited.

As illustrated, the color filters CF include first color filters CF1 located in the display area DA and second color filters CF2 located in the non-display area NDA. That is, in the second substrate SUB2, the color filters CF1 are located in the light transmission area TA and the color filters CF2 are located in the non-transmission area TA. The first color filters CF1 and the second color filters CF2 are arranged in the same layer and all on the inner surface 20A. In the example illustrated, the second color filters CF2 are in contact with the respective first color filters CF1. A thickness T11 of the color filters CF1 and a thickness T12 of the color filters CF2 are the same. Further, the color filters CF1 and the color filters CF2 are of the same color, for example. The color filters CF comprise a portion CFA disposed on a surface of the second color filter CF2, which opposes the first substrate SUB1. The second color filter CF2 and the portion CFA are formed from the same material as that of one of the color filters CFR, CFG and CFB of the display area DA. Note that the second color filter CF2 and the portion CFA are formed of resin materials colored in different colors. In this embodiment, for example, the second color filter CF2 is formed from the same material as that of the blue color filter CFB and the portion CFA is formed from that same material as that of the red color filter CFR. Here, the first color filter CF1 may be formed from the same material as that of the second color filter CF2 or from a resin material colored in a different color from that of the second color filter CF2. The color filters CF comprise a recess portion CC2 at a location opposing the recess portion CC1 along the third direction Z.

Note that in the color filters CF illustrated, the portion CFA is in contact with the second color filter CF2, but the color filters CF may include another layer of color filter formed from a resin material of a different color from that of the second color filter CF2 and the portion CFA, between the second color filter CF2 and the portion CFA, the second insulating substrate 20 and second color filter CF2 or between the portion CFA and the overcoat layer OC.

The light-shielding layer BM comprises a first light-shielding layer BM1 disposed on the display area DA and a second light-shielding layer BM2 disposed on the non-display area NDA. That is, in the second substrate SUB2, the first light-shielding layer BM1 is disposed in the light transmission area TA and the second light-shielding layer BM2 is disposed in the non-transmission area TA. The first light-shielding layer BM1 is provided on a first substrate SUB1 side of the first color filter CF1. The second light-shielding layer BM2 is provided on a first substrate SUB1 side of the second color filter CF2. In other words, the color filter CF1 is provided between the first light-shielding layer BM1 and the second insulating substrate 20. Further, the color filter CF2 is provided between the second light-shielding layer BM2 and the second insulating substrate 20. The second light-shielding layer BM2 covers substantially the entire second color filter CF2.

Here, the thickness T1 of the first light-shielding layer BM1 is different from and the thickness T2 of the second light-shielding layer BM2. In the example illustrated, the thickness T1 is greater than the thickness T2. That is, in the display area DA, a plurality of color filters each including a first color filter CF1 are arranged to be adjacent and in contact with each other, whereas in the non-display area NDA, a single second color filter extends therein. The color filters CF1 have a width W1 along the first direction X, and the color filter CF2 has a width W2 along the first direction X. The width W1 is set to less than the width W2. The resist to be applied when forming the light-shielding layer BM spreads wide more easily, as the surface of the underlayer is more flat, and therefore the resist is formed thinner. On the other hand, as the surface of the underlayer becomes more uneven, the resist can not spread easily and therefore the resist is formed thicker. Therefore, in the example illustrated, when applying a resist to form the light-shielding layer BM, the resist spreads more easily in the non-display area NDA, which is comparatively more flat than in the display area DA which has a level difference near the boundary between adjacent color filters, and the thickness T2 of the second light-shielding layer BM2 is set less than the thickness T1 of the first light-shielding layer BM1.

The second light-shielding layer BM2 comprises a slit 200 in a position which overlaps a recess portion CC2. Therefore, the entering path of moisture transmitting the second light-shielding layer BM2 or that transmitting the interface between the second light-shielding layer BM2 and the second color filter CF2, or that transmitting the interface between the second light-shielding layer BM2 and the overcoat layer OC can be blocked by the slit 200. Further, the first substrate SUB1 comprises a peripheral wiring line G' in a position which overlaps the slit 200. The peripheral wiring line G' is in the same layer as that of the gate line G, but may be in the same layer as that of the source wiring line S. Thus, the leakage of light from the slit 200 can be suppressed. Note that the first substrate SUB1 may comprise other wiring lines in the position overlapping the slit 200.

The second light-shielding layer BM2 comprises a slit 300 in a region of the non-display area NDA, which overlaps the liquid crystal layer LQ. Therefore, the charge conveying path to the display area DA via the second light-shielding layer BM2 can be blocked by the slit 300. Thus, in the manufacturing process of the display panel PNL, it is possible to suppress the concentration of static electricity on the display area DA and damage to the display panel PNL. Further, the first substrate SUB1 comprises peripheral wiring lines S' in a position which overlaps the slit 300. The peripheral wiring lines S' are in the same layer as that of the source line S, for example, but may be in the same layer as that of the gate wiring line G. Thus, the leakage of light from the slit 200 can be suppressed. Note that the first substrate SUB1 may comprise other wiring lines in the position overlapping the slit 300. Further, the portion CFA is located in the slit 300. That is, in the position which overlaps the slit 300, the second color filter CF2 and the portion CFA is formed to stack one on another along the third direction Z.

From the first layer CFa and the second layer CFb of different colors and therefore the third portion CF3 can further suppress the light leakage from the slit 300. A width of the third portion CF3 along the first direction X is greater than that of the slit 300 along the first direction X. Thus, the leakage of light which passes through the surroundings of the peripheral wiling lines S' from the slit 300 can be suppressed as well.

The overcoat layer OC covers the second light-shielding layer BM2 in the display area DA and also the first light-shielding layer BM1 in the non-display area NDA.

The second substrate SUB2 comprises a first spacer SP1 disposed in the display area DA and a second spacer SP2 in the non-display area NDA. The first spacer SP1 and the second spacer SP2 are arranged on a side of the overcoat layer OC, which opposes the first substrate SUB1. The first spacer SP1 is surrounded by the liquid crystal layer LQ. The first spacer SP1 comprises a surface SP1a on a side of the first substrate SUB1 and a surface (bottom) SP1b in contact with the overcoat layer OC. The surface SP1a is in contact with the first substrate SUB1. The first spacer SP1 is disposed in a position that overlaps the first color filter CF1, the first light-shielding layer BM1 and the overcoat layer OC. The second spacer SP2 is surrounded by the sealing member SL. The second spacer SP2 comprises a surface SP2a on a side of the first substrate SUB1 and a surface (bottom) SP2b in contact with the overcoat layer OC. The surface SP2a is spaced apart from the first substrate SUB1 by only a distance D, not in contact with the first substrate SUB1. The second spacer SP2 is disposed in a position that overlaps the second color filter CF2, the second light-shielding layer BM2 and the overcoat layer OC. In this embodiment, a width of the surfaces SP1a and SP2a along the first direction X is about 10 µm, and a width of the surfaces SP1b and SP2b along the first direction X is about 15 µm.

The first spacer SP1 has a height H1 taken from the second substrate SUB2 to the first substrate SUB1. The second spacer SP2 has a height H2 taken from the second substrate SUB2 to the first substrate SUB1. The height H2 is equal to the height H1. That is, the distance from the surface SP1a to the surface SP1b along the third direction Z is equal to the distance from the surface SP2a to the surface SP2b along the third direction Z.

The first spacer SP1 is formed in a position which overlaps, for example, an intersection between the source line S and the gate line G, into a shape of dotted pillars for each pixel. Further, the second spacer SP2 may be formed into a shape of a continuous wall which surrounds the display area DA in its entire circumference, or may be into the shape of a discontinuous wall or the shape of dotted pillars.

In the example illustrated, a single second spacer SP2 is provided in a position which overlaps the sealing member SL, but a plurality of spacers may be arranged according to the width of the frame of the display device along the first direction X, as will be described later.

As described above, the thickness T2 of the second light-shielding layer BM2 is set less than the thickness T1 of the first light-shielding layer BM1. Therefore, a thickness T4 from the inner surface 20A of the second insulating substrate 20 to the surface SP2b of the second spacer SP2 is less than a thickness T3 from the inner surface 20A of the second insulating substrate 20 to the surface SP1b of the first spacer SP1.

Further, the second substrate SUB2 comprises a projection 6 in the non-display area NDA on a side of the overcoat layer OC, which opposes the first substrate SUB1. An end 6E of the projection 6, an edge portion 10E of the first insulating substrate 10 and an edge portion 20E of the second insulating substrate 20 are located substantially on a straight line along the third direction Z. The projection 6 may be formed in the shape of a continuous wall which surrounds the display area DA, or may be into the shape of a discontinuous wall or the shape of dotted pillars. Further, the projection 6 may be disposed in the first substrate SUB1.

The display panel PNL is manufactured, for example, by attaching a first mother board from which a plurality of first substrates SUB1 are obtained and a second mother board from which a plurality of second substrates SUB2 are obtained, together with the sealing member SL, followed by cutting. Here, the projection 6 is located on each of cut lines of the first mother board and the second mother board, and thus the sealing member SL is not substantially interposed along the cut lines. For this reason, the external stress applied while cutting is concentrated toward the projection 6, thereby making it possible to suppress the occurrence of cutting errors in the first mother board and the second mother board. Moreover, since the sealing member SL is not substantially present in the positions along the cut lines, the display panels PNL cut off can be easily separated from each other.

In the example illustrated, the second alignment film AL2 is arranged to extend to the non-display area NDA, but end without reaching a position which overlap the edge portion 20E of the second insulating substrate 20. Note that the second alignment film AL2 may extend all the way to the position overlapping the edge portion 20E of the second insulating substrate 20.

The sealing member SL is disposed between the first substrate SUB1 and the second substrate SUB2. The sealing member SL can be formed from, for example, a heat-curing epoxy resin, or a photo-curing (for example, ultraviolet-curing) acrylic resin. In the case of the latter, the material of the sealing member SL contains an epoxy resin, and therefore the bonding strength between the sealing member SL and the substrates (the first and second substrates SUB1 and SUB2) can be enhanced.

The sealing member SL contains, for example, a filler F. In this embodiment, the filler F is formed into approximately a spherical shape. For example, the sealing member SL can be controlled in terms of viscosity, bond strength and linear expansion coefficient by the content of the filler F. By containing the filler F, the sealing member SL can maintain the adhesive strength regardless of the change in temperature or humidity, making it possible to improve its reliability. In the example illustrated, the filler F is interposed between the second spacer SP2 and the first substrate SUB1. Here, the width W of the surface SP2a of the second spacer SP2 along the first direction X is greater than a diameter DM of the filler F. In the example illustrated, a single filler F is interposed between the surface SP2a and the first substrate SUB1, but there may be a plurality of fillers F. In this embodiment, the diameter DM of the filler F is, for example, about 1 µm. Here, the diameter DM is substantially equal to the distance D between the surface SP2a of the second spacer SP2 and the first substrate SUB1.

When the filler is formed from an inorganic material, the filler contains, for example, calcium carbonate, magnesium carbonate, barium sulfate, magnesium sulfate, aluminum silicate, zirconium silicate, iron oxide, titanium oxide, aluminum oxide (alumina), zinc oxide, silica dioxide, potassium titanate, kaolin, talc, glass beads, sericite activated clay, bentonite, aluminium nitride, silicon nitride or the like. When the filler is formed from an organic material, it contains polystyrene, styrene, or a copolymer obtained by copolymerizing a monomer which can be copolymerized therewith, polyester fine particles, polyurethane fine particles, rubber fine particles or the like. As the filler, an inorganic filler, especially, for example, silica dioxide or talc, is preferable because they can reduce the coefficient of linear expansion of the sealing member SL and maintain the shape thereof.

According to this embodiment, the first spacer SP1 located in the display area DA and the second spacer SP2 located in the non-display area NDA have the same height, and the thickness T4 from the inner surface 20A of the second insulating substrate 20 to the surface SP2b of the second spacer SP2 is set less than the thickness T3 from the inner surface 20A of the second insulating substrate 20 to the surface SP1b of the first spacer SP1. With this structure, when the first spacer SP1 is brought into contact with the first substrate SUB1, the second spacer SP2 is spaced apart from the first substrate SUB1, and the interval between the surface SP2a of the second spacer SP2 and the first substrate SUB1 are spaced apart from each other by only the distance D equivalent to the diameter DM of the filler. Thus, the filler F is interposed between the second spacer SP2 and the first substrate SUB1. Therefore, the thickness of the display panel PNL can be maintained substantially equal in the display area DA and the non-display area NDA. As a result, a cell gap equivalent to that of the central portion of the display area DA can be formed in the peripheral portion of the display area DA, which is adjacent to the non-display area NDA, thereby making it possible to suppress non-uniformity in display resulting from the unevenness of the cell gap.

According to the configuration example shown in FIG. 3, the second color filter CF2 is formed in contact with the first color filter CF1, and the width of the second color filter CF2 along the first direction X is greater than the width of a single first color filter CF1 along the first direction X. Therefore, the thickness T2 of the second light-shielding layer BM2 is less than the thickness T1 of the first light-shielding layer BM1, and the thickness T4 is less than the thickness T3. Here, the technique to set the thickness T4 less than the thickness T3 is not limited to that shown in FIG. 3, but any of the examples which will be described later with reference to FIGS. 5 to 10 is applicable.

Moreover, according to this embodiment, the light-shielding layer BM is disposed on the first substrate SUB1 side with respect to the color filter CF. With this structure, it is possible to inhibit degradation of the display quality by color mixture even if the display panel PNL is viewed from an oblique direction. Further, it is no longer necessary to expand the width of the light-shielding layer BM for prevention of color mixture, and therefore the reduction of the area which contributes to display per pixel can be suppressed. Consequently, the aperture ratio can be improved, thereby making it possible to further improve the definition and brightness.

As described above, according to this embodiment, a liquid crystal display which can suppress deterioration of display quality can be obtained.

Further, in the liquid crystal display of the embodiment described above, in order to maintain the thickness of the display panel PNL equal in the display area DA and the non-display area NDA while interposing the filler between the surface SP2*a* and the first substrate SUB1, the distance D between the surface SP2*a* and the first substrate SUB1 should preferably be substantially equal to the diameter DM of a single filler F. But, the distance D may be slightly greater or less than the diameter DM.

Furthermore, a sum (T3+H1) of the thickness T3 from the inner surface 20A of the second insulating substrate 20 to the surface SP1*b* of the first spacer SP1 and the height H1 of the first spacer SP1 in the display area DA is substantially equal to a sum (T4+H2+D) of the thickness T4 from the inner surface 20A of the second insulating substrate 20 to the surface SP2*b* of the second spacer SP2, the height H2 of the second spacer SP2 and the distance D between the surface SP2*a* and the first substrate SUB1 in the non-display area NDA.

Next, other configuration examples will be described.

Figure 4:
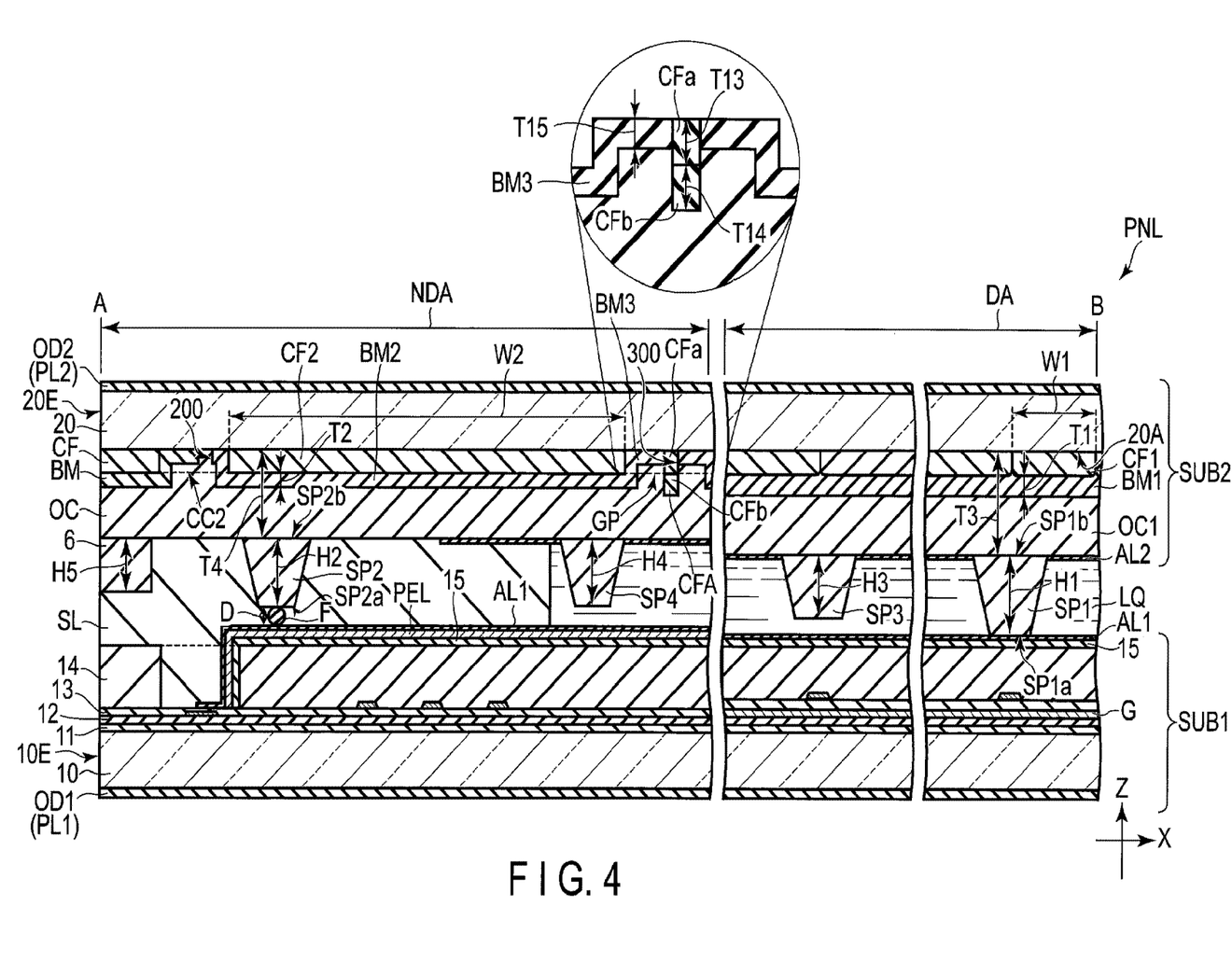
FIG. 4 is a cross-sectional view of another example of the display panel PNL taken along line A-B in FIG. 1.

FIG. 4 is a cross section of another configuration example of the display panel PNL taken along line A-B in FIG. 1. The configuration example shown in FIG. 4 is different from that of FIG. 3 in that the second color filter CF2 is spaced apart from the first color filter CF1. Further, the example of FIG. 4 is different from that of FIG. 3 in that the display panel PNL comprises two spacers in the non-display area NDA. Hereafter, the main differences will be described.

The display panel PNL comprises a third spacer SP disposed in the display area DA and a fourth spacer SP4 disposed in the non-display area NDA.

The third spacer SP3 has a height H3 taken from the second substrate SUB2 to the first substrate SUB1. The height H3 is less than the height H1. The third spacer SP3 is not in contact with the first substrate SUB1. The fourth spacer SP4 has a height H4 taken from the second substrate SUB2 to the first substrate SUB1. The height H4 is the same as the height H1. That is, the height H4 is the same also as the height H2. The fourth spacer SP4 is not in contact with the first substrate SUB1 as in the case of the third spacer SP3. Further, the projection 6 has a height H5 taken from the second substrate SUB2 to the first substrate SUB1. The height H5 is the same as the height H3.

That is, in the display area DA, the first spacer SP1 functions as a main spacer to maintain the gap (cell gap) between the first substrate SUB1 and the second substrate SUB2, and the third spacer SP3 functions as a sub-spacer which functions secondarily auxiliary when an external pressure is applied to the second substrate SUB2.

The second color filter CF2 overlaps the projection 6, the second spacer SP2 and the fourth spacer SP4. The width W2 of the second color filter CF2 along the first direction X is greater than the width W1 of the first color filter CF1 along the one first direction X. Therefore, the thickness T2 of the second light-shielding layer BM2 is less than the thickness T1 of the first light-shielding layer BM1.

Consequently, an advantageous effect similar to that described above can be obtained.

Note that the second substrate SUB2 has a gap GP between the color filter CF1 and the color filter CF2. The light-shielding layer BM includes a third light-shielding layer BM3 disposed in the gap GP. The third light-shielding layer BM3 is in contact with the second insulating substrate 20. In the example illustrated, the third light-shielding layer BM3 comprises a slit 300 in the gap GP. In the example illustrated, a portion CFA of the color filter CF comprises a first layer CFa and a second layer CFb, and consists of a stacked layer of the first layer CFa and the second layer CFb. The first layer CFa is located under the second insulating substrate 20 and in the slit 300. The second layer CFb is located under the first layer CFa to stack.

In this embodiment, one of the first layer CFa and the second layer CFb is of the same color as that of the color filter CF1 and the other is of a different color from that of the color filter CF1. For example, one of the first layer CFa and the second layer CFb is a blue color filter, and the other a red color filter. The first layer CFa is equivalent to a third color filter and the second layer CFb is equivalent to a fourth color filter.

Here, the first layer CFa has a thickness T13 along the third direction Z, and the second layer CFb has a thickness T14 along the third direction Z. The third light-shielding layer BM3 has a thickness T15 along the third direction Z. A sum of the thickness T13 of the first layer CFa and the thickness T14 of the second layer CFb is greater than the thickness T15 of the third light-shielding layer BM3. That is, of the portion CFA, the second layer CFb projects out to the overcoat layer OC side.

Figure 5:
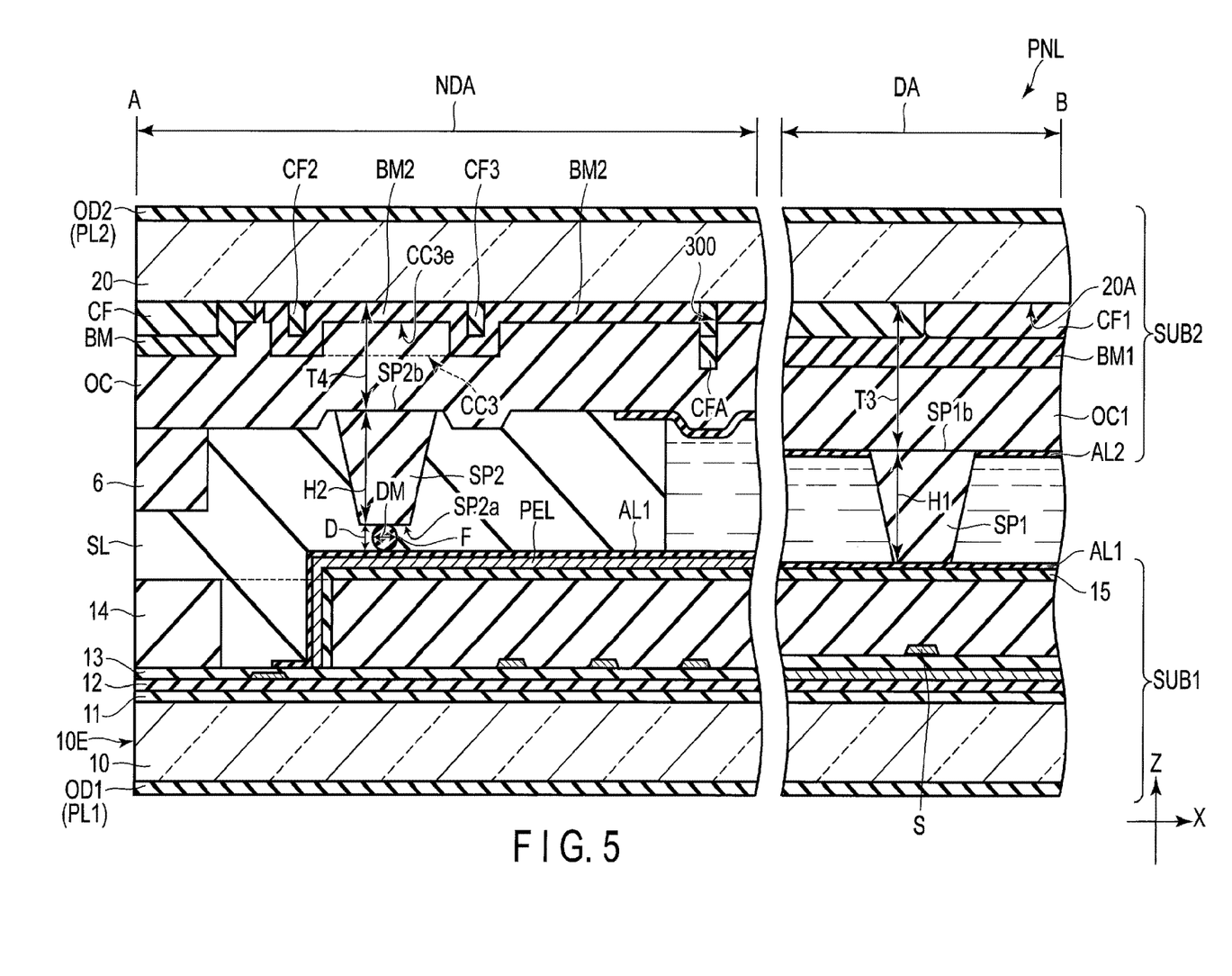
FIG. 5 is a cross-sectional view of still another example of the display panel PNL taken along line A-B in FIG. 1.

FIG. 5 is a cross section of another configuration example of the display panel PNL taken along line A-B in FIG. 1. The configuration example shown in FIG. 5 is different from that of FIG. 3 in that the color filter CF comprises a third color filter CF3 disposed in the non-display area NDA.

The third color filter CF3 is disposed to be spaced apart from the second color filter CF2. In the example illustrated, a width of the second color filter CF2 and the third color filter CF3 along the first direction X is set less than a width of a single first color filter CF1 along the first direction X. Here, for example, the second color filter CF2 and the third color filter CF3 are of the same color, and formed in the same process. The second color filter CF2 and the third color filter CF3 do not overlap the second spacer SP2 along the third direction Z. That is, in the non-display area NDA, the second light-shielding layer BM2 covers the second color filter CF2 and the third color filter CF3 and also an inner surface 20A between the second color filter CF2 and the third color filter CF3. The second spacer SP2 overlaps the second light-shielding layer BM2 disposed between the second color filter CF2 and the third color filter CF3. That is, between the second spacer SP2 and the second insulating substrate 20, the second light-shielding layer BM2 and the overcoat layer OC are interposed, and no color filters are interposed. Here, the second light-shielding layer BM2 comprises a recess portion CC3 between the second color filter CF2 and the third color filter CF3. The region where the surface SP2b of the second spacer SP2 is disposed is included in the region in which a bottom CC3e of the recess portion CC 3 is located when viewed along the third direction Z. Between the bottom CC3e and the second insulating substrate 20, no color filters CF are provided, and therefore the thickness T4 is less than the thickness T3.

Consequently, an advantageous effect similar to that described above can be obtained.

Figure 6:
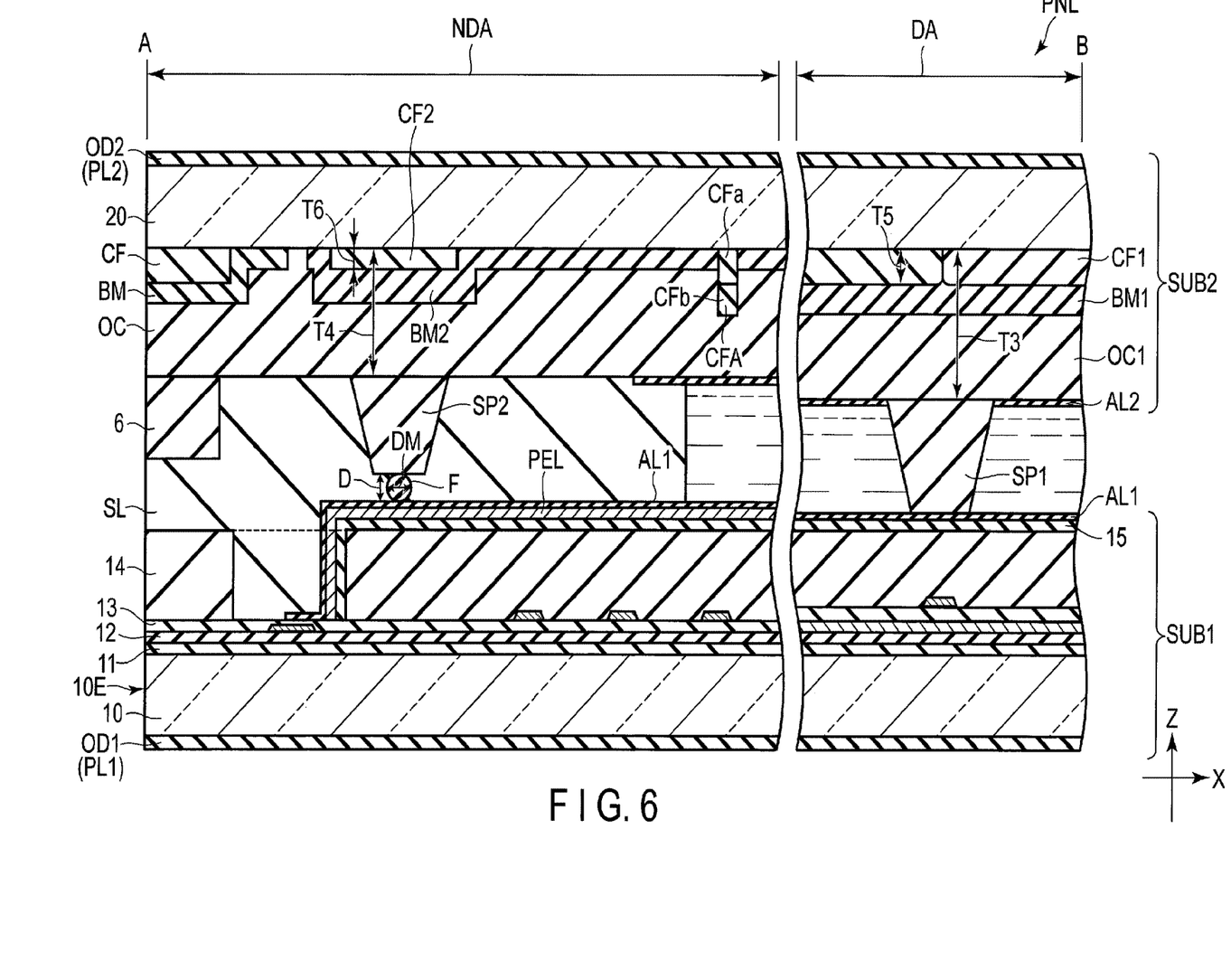
FIG. 6 is a cross-sectional view of still another example of the display panel PNL taken along line A-B in FIG. 1.

FIG. 6 is a cross section of another configuration example of the display panel PNL taken along line A-B in FIG. 1. The configuration example shown in FIG. 6 is different from that of FIG. 3 in that the second color filter CF2 is spaced apart form the first color filter CF1 and the second color filter CF2 is formed thinner than the first color filter CF1.

The second color filter CF2 is disposed in a position which overlaps the second spacer SP2 along the third direction Z. A thickness T6 of the second color filter CF2 is less than a thickness T5 of the first color filter CF1. The color filters CF as such can be formed, for example, by applying half-tone exposure in the process of selecting a positive resist as the material for the color filters to form the color filters CF. More specifically, after forming a positive-type resist film, the region for the first color filter CF1 is shielded from light and the region for the second color filter CF2 is exposed via a half-tone mask. Then, the positive resist is developed in a developing solution, and only the exposed surface of the positives resist is removed by the developing solution. After that, the positive resist is calcined and thus color filters CF such as illustrated are formed. Note that the thickness of the first light-shielding layer BM1 is substantially equal to that of the second light-shielding layer BM2. Therefore, the thickness T4 is less than the thickness T3.

Consequently, an advantageous effect similar to that described above can be obtained.

Figure 7:
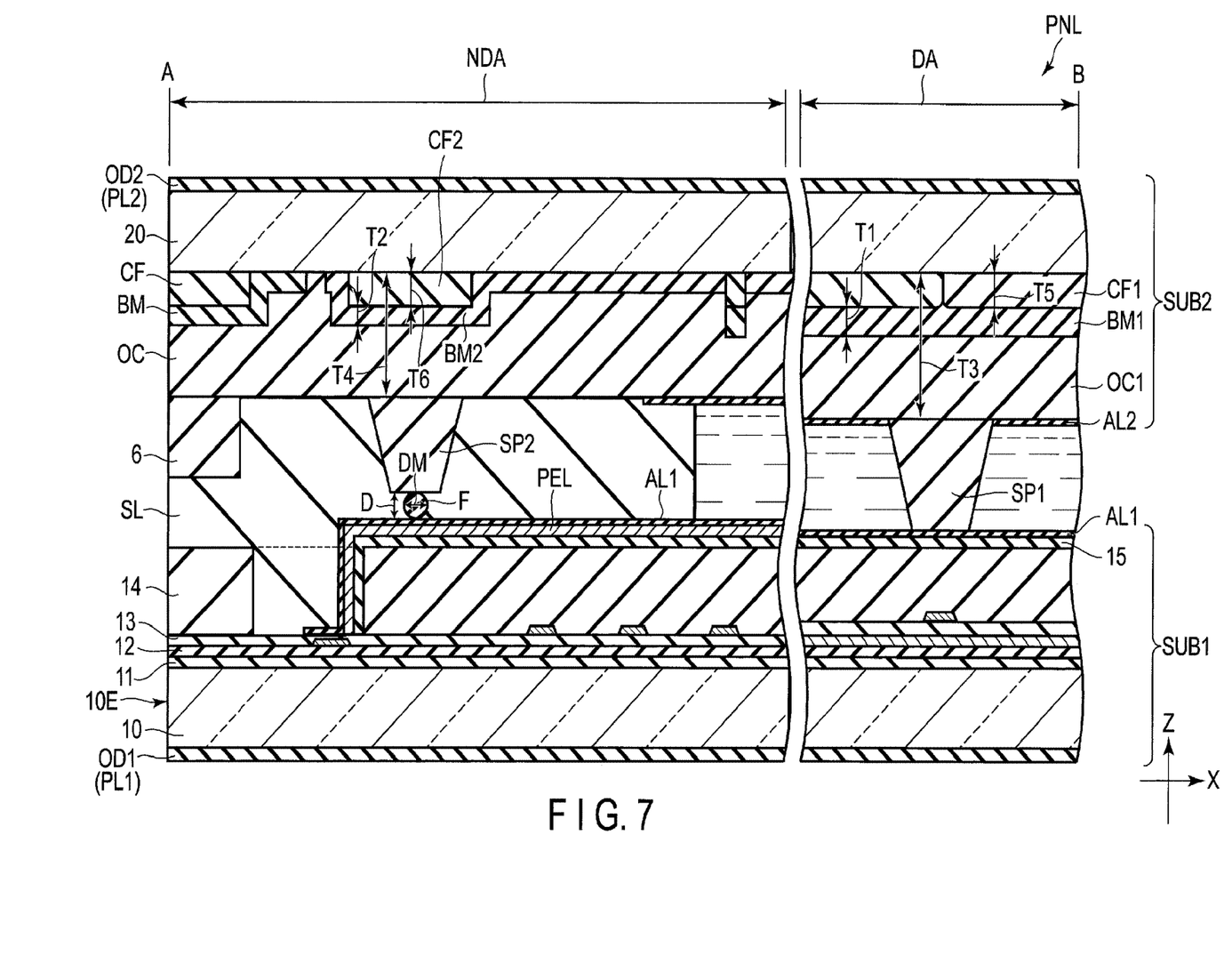
FIG. 7 is a cross-sectional view of still another example of the display panel PNL taken along line A-B in FIG. 1.

FIG. 7 is a cross section of another configuration example of the display panel PNL taken along line A-B in FIG. 1. The configuration example shown in FIG. 6 is different from that of FIG. 3 in that the thickness T5 of the first color filter CF1 is equal to the thickness T6 of the second color filter CF2 and the thickness T2 of the second light-shielding layer BM2 is less than the thickness T1 of the first light-shielding layer BM1.

The second light-shielding layer BM2 is disposed in a position which overlaps the second spacer SP2 along the third direction Z. Here, for example, as in the case of the process of forming the color filters CF shown in FIG. 6, half-tone exposure may be applied in a process of forming the light-shielding layer BM. In this case, a light-shielding layer BM such as illustrated can be formed. Therefore, the thickness T4 is less than the thickness T3.

Consequently, an advantageous effect similar to that described above can be obtained.

Note here that the configuration example in which the second color filter CF2 is formed thinner than the first color filter CF1 as shown in FIG. 6, and you may combine the of structure which makes, and the configuration example in which the second light-shielding layer BM2 is formed thinner than the first light-shielding layer BM1 as shown in FIG. 7 may be combined.

The examples shown in FIGS. 3 to 7 are configured to avoid the distance D between the surface SP2a and the first substrate SUB1 from becoming less than the diameter DM of the filler F. Examples shown in FIGS. 8 to 10 below are configured to avoid that the distance D between the surface SP2a and the first substrate SUB1 from becoming greater than the diameter DM of the filler F.

Figure 8:
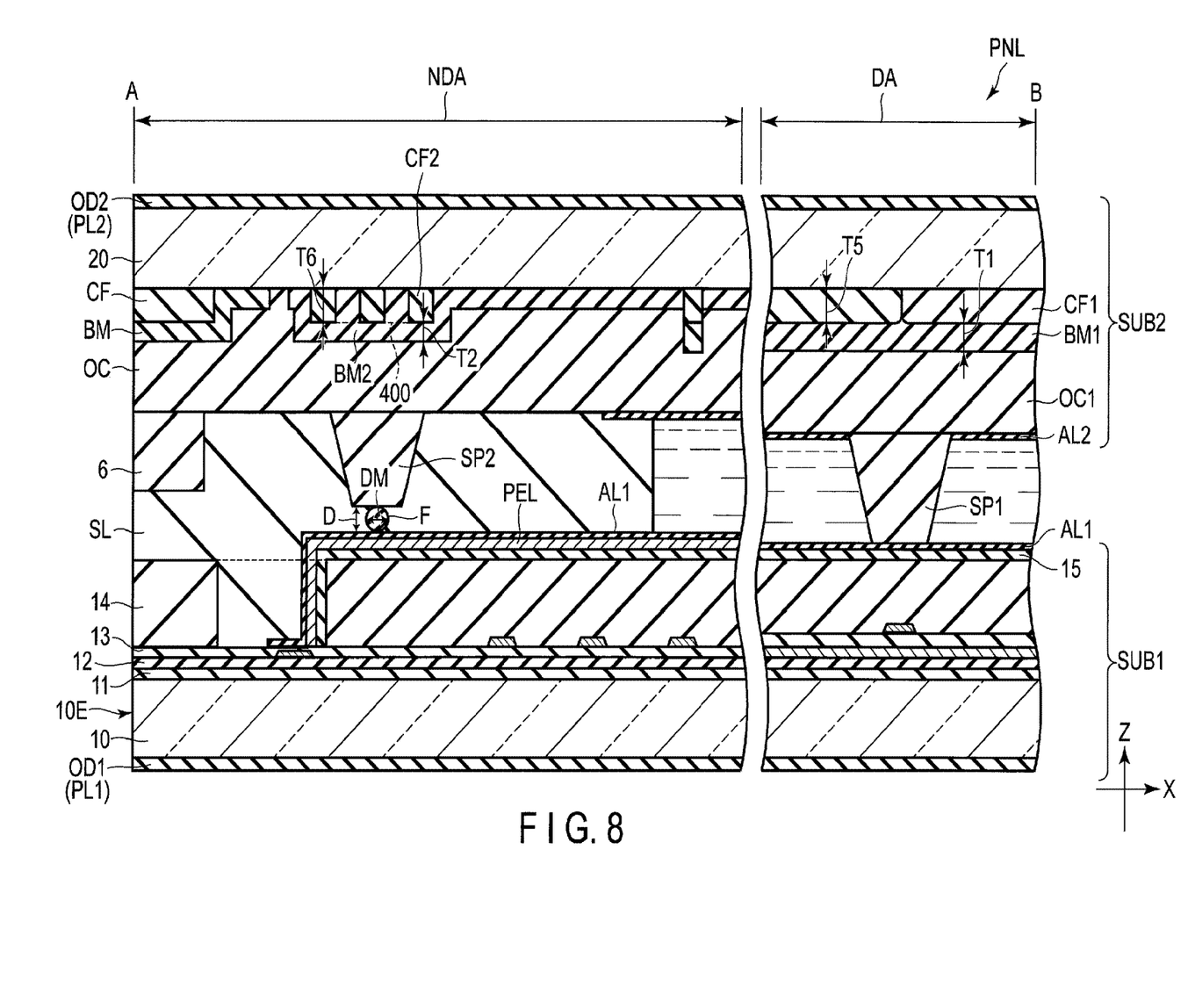
FIG. 8 is a cross-sectional view of still another example of the display panel PNL taken along line A-B in FIG. 1.

FIG. 8 is a cross section of another configuration example of the display panel PNL taken along line A-B in FIG. 1. The configuration example shown in FIG. 8 is different from that of FIG. 7 in that the second color filter CF2 comprises slits 400.

The second color filter CF2 is disposed in a position which overlaps the second spacer SP2 along the third direction Z. In the example illustrated, the second color filter CF2 comprises two slits 400. The thickness T5 of the color filter CF1 is substantially equal to the thickness T6 of the color filter CF2. The thickness T2 of the portion of the second light-shielding layer BM2, which overlaps the second color filter CF2 is less than the thickness T1 of the first light-shielding layer BM1, but the second light-shielding layer BM2 is formed thicker as compared to the case where the second color filter CF2 comprises no slits 400.

Consequently, an advantageous effect similar to that described above can be obtained.

Figure 9:
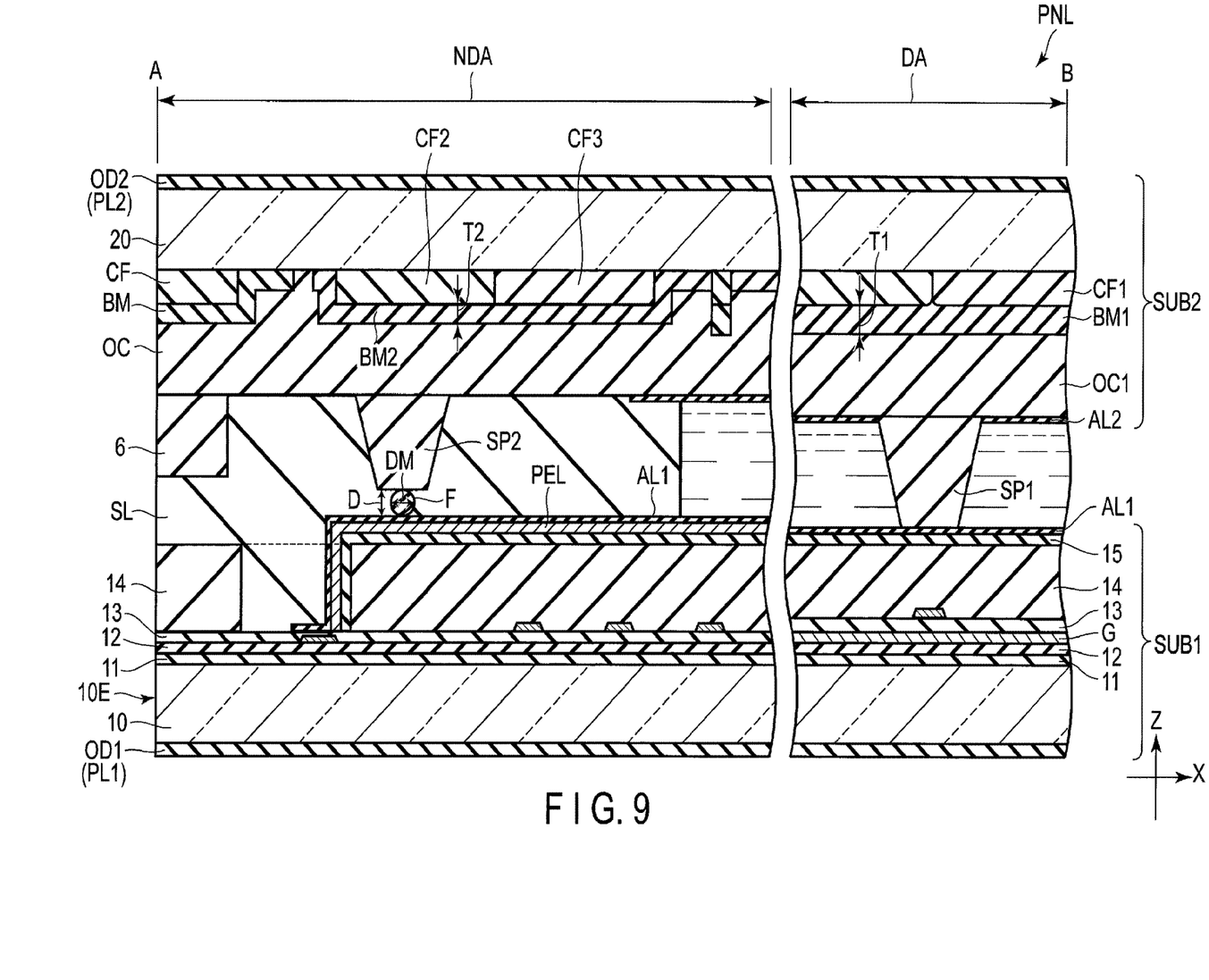
FIG. 9 is a cross-sectional view of still another example of the display panel PNL taken along line A-B in FIG. 1.

FIG. 9 is a cross section of another configuration example of the display panel PNL taken along line A-B in FIG. 1. The configuration example shown in FIG. 9 is different from that of FIG. 7 in that the color filter CF comprises the third color filter CF3 disposed in the non-display area NDA.

The third color filter CF3 is located adjacent to and in contact with the second color filter CF2. The second light-shielding layer BM2 covers the second color filter and the third color filter. The thickness of the second color filter CF2 and that of the third color filter are equal to each other along the third direction Z. The width of the second color filter CF2 and the third color filter CF3 along the first direction X is set greater than the width of a single first color filter CF1 along the first direction X. Therefore, the thickness T2 of the portion of the second light-shielding layer BM2, which overlaps the second color filter CF2 and the third color filter CF3 is less than the thickness T1 of the first light-shielding layer BM1, whereas the second light-shielding layer BM2 is formed thicker as compared to the case where the second color filter CF2 is formed to be connected with the first color filter CF3 as shown in FIG. 3.

Consequently, an advantageous effect similar to that described above can be obtained.

Figure 10:
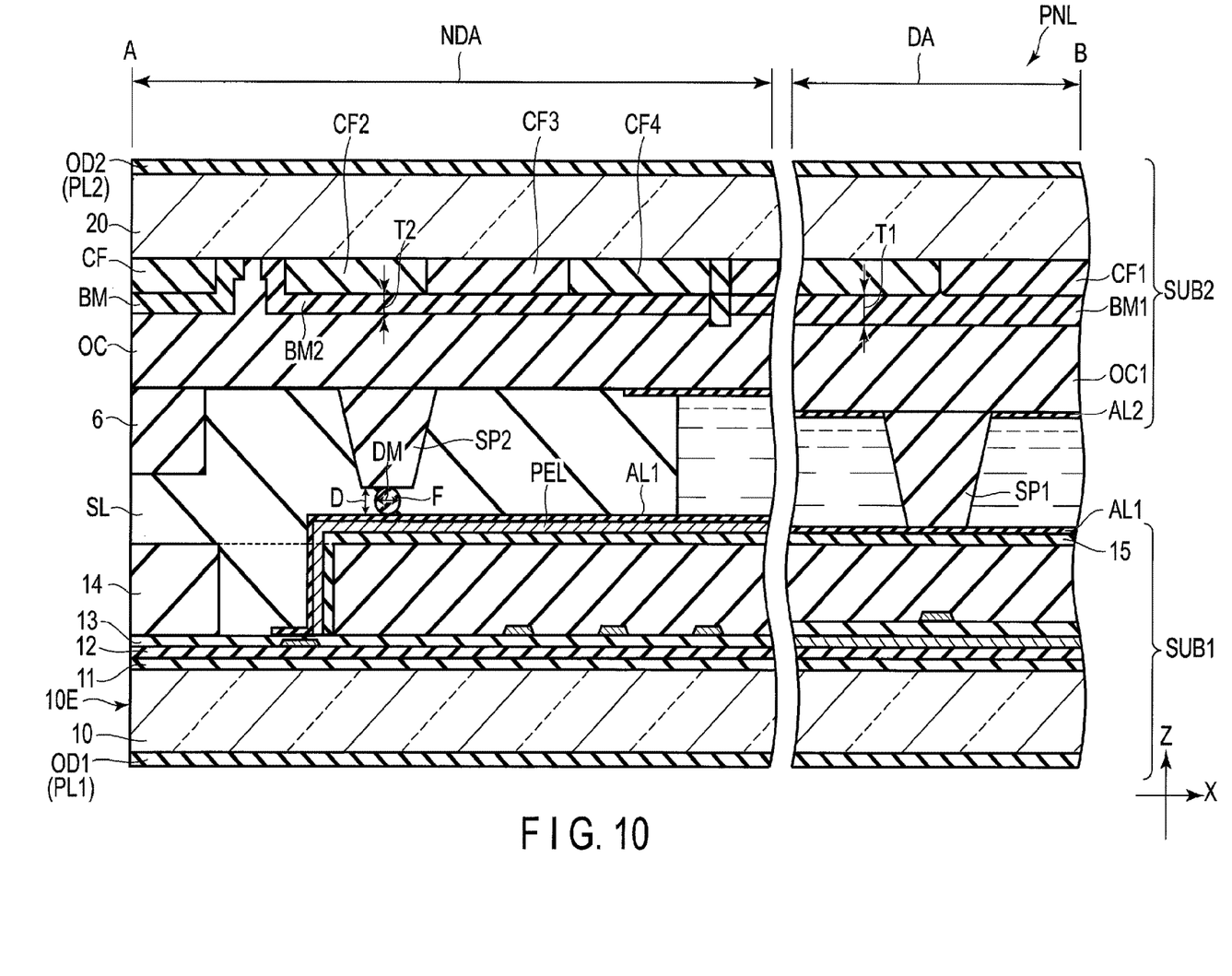
FIG. 10 is a cross-sectional view of still another example of the display panel PNL taken along line A-B in FIG. 1.

FIG. 10 is a cross section of another configuration example of the display panel PNL taken along line A-B in FIG. 1. The configuration example shown in FIG. 10 is different from that of FIG. 9 in that the color filters CF are continuously formed from the first color filter CF1 of the display area DA to the second color filter CF2 in the non-display area NDA.

The color filters CF include a fourth color filter CF4 adjacent to and in contact with the third color filter CF3. In the example illustrated, the first color filter CF1, the second color filter CF2, the third color filter CF3 and the fourth color filter CF4 are connected to each other.

Note that the third color filter CF3 and color filter CF1 may be in contact with and connected to each other, or as illustrated, one or more color filters CF may be interposed between the third color filter and the first color filter CF1.

Consequently, an advantageous effect similar to that described above can be obtained.

As described above, according to the embodiments, a liquid crystal display which can suppress deterioration of display quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display comprising:
   a display area which displays images;
   a non-display area surrounding the display area;
   a first substrate comprising pixels in the display area;
   a second substrate comprising an insulating substrate, a first color filter disposed in the display area, a second color filter disposed in the non-display area, a first light-shielding layer disposed in the display area and provided on the first substrate side of the first color filter, a second light-shielding layer disposed in the non-display area and provided on the first substrate side of the second color filter, a first spacer disposed in the display area and a second spacer disposed in the non-display area, the second substrate opposing the first substrate; and
   a sealing member disposed in the non-display area to surround the second spacer and comprising a filler, which attaches the first substrate and the second substrate together, wherein
   the first light-shielding layer is shaped in such a manner that the first light-shielding layer allows the light to pass through the display area,
   the first color filter and the second color filter being provided on an inner surface of the insulating substrate, which opposes the first substrate, and
   the first spacer having a same height as that of the second spacer along a direction from the second substrate to the first substrate, being in contact with the first substrate, the filler being interposed between the second spacer and the first substrate, and a thickness from the inner surface of the insulating substrate to a bottom of the second spacer being less than another thickness from the inner surface of the insulating substrate to another bottom of the first spacer.

2. The liquid crystal display of claim 1, wherein
   the second color filter is located in a position which overlaps the second spacer, and is connected with the first color filter.

3. The liquid crystal display of claim 1, further comprising:
   a third color filter disposed in the non-display area and spaced apart from the second color filter,
   wherein the second spacer overlaps the second light-shielding layer disposed between the second color filter and the third color filter.

4. The liquid crystal display of claim 3, wherein the second color filter and the third color filter are a same color.

5. The liquid crystal display of claim 1, wherein the second color filter is disposed in a position which overlaps the second spacer, and has a thickness less than that of the first color filter.

6. The liquid crystal display of claim 1, wherein
   the second light-shielding layer is disposed in a position which overlaps the second spacer, and has a thickness less than that of the first light-shielding layer.

7. The liquid crystal display of claim 1, wherein
   a width of a surface of the second spacer is greater than a diameter of the filler.

8. The liquid crystal display of claim 1, wherein
   the second color filter is disposed in a position which overlaps the second spacer, and comprises a slit.

9. The liquid crystal display of claim 1, further comprising:
   a third color filter disposed in the non-display area and adjacent to and in contact with the second color filter, wherein
   the second light-shielding layer covers the second color filter and the third color filter.

10. The liquid crystal display of claim 9, wherein
    the first color filter, the second color filter and the third color filter are connected together.

* * * * *